Nov. 11, 1941.    G. O. MATTER    2,262,691
METHOD OF MAKING OBLIQUE HELICOID SPIRAL CUTTERS
Filed May 29, 1939    2 Sheets-Sheet 1
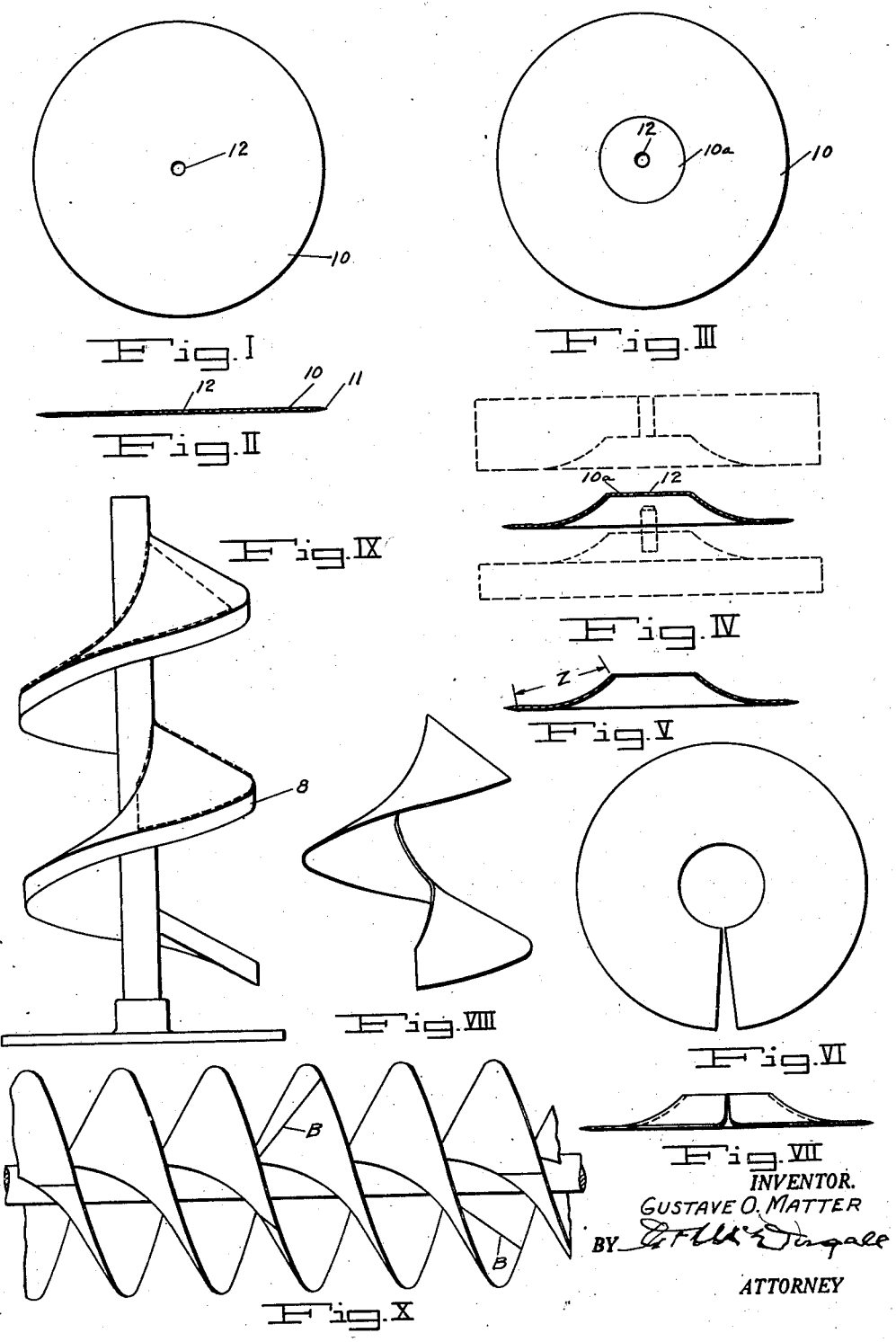

Nov. 11, 1941.  G. O. MATTER  2,262,691
METHOD OF MAKING OBLIQUE HELICOID SPIRAL CUTTERS
Filed May 29, 1939  2 Sheets-Sheet 2
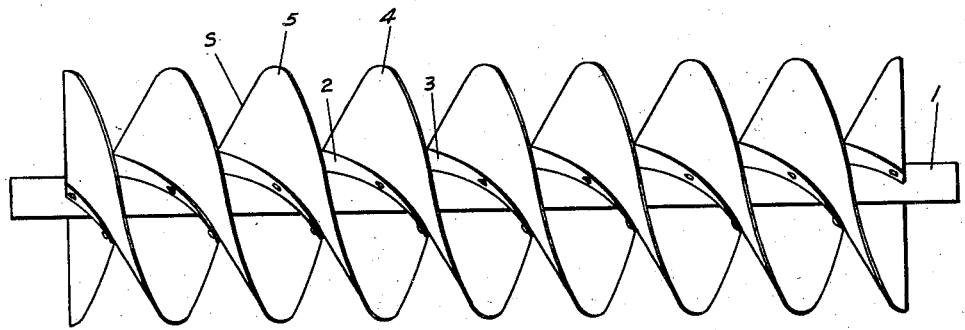
Fig XI
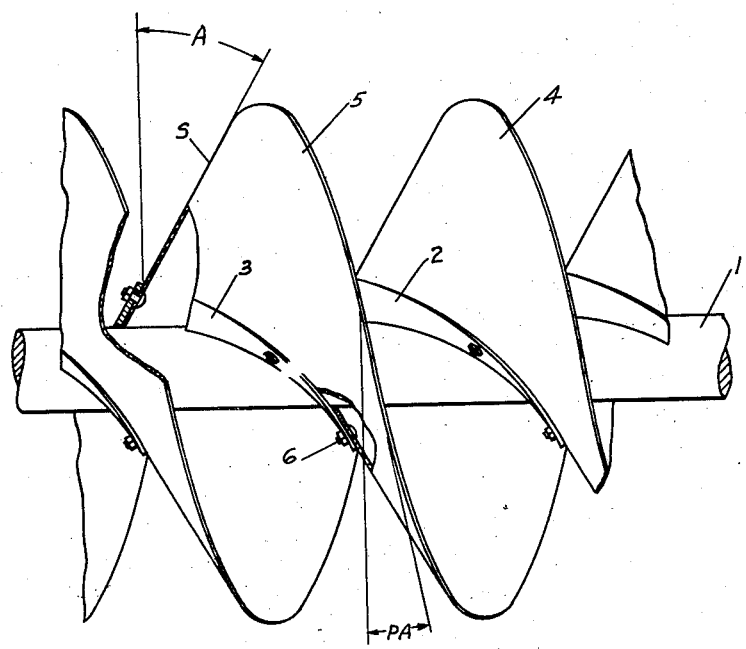
Fig XII
INVENTOR.
GUSTAVE O. MATTER
BY
ATTORNEY Patented Nov. 11, 1941

2,262,691

UNITED STATES PATENT OFFICE 2,262,691

METHOD OF MAKING OBLIQUE HELICOID SPIRAL CUTTERS

Gustave O. Matter, Portland, Oreg.

Application May 29, 1939, Serial No. 276,332

1 Claim. (Cl. 29—14)

This invention relates to a method of making an oblique helicoidal spiral cutter for a rotary plow, described and claimed in my co-pending application, Serial Number 276,331, filed May 29, 1939.

After getting flat refusals from numerous plate steel fabrication works, I made it as a matter of necessity.

The objective is an oblique helicoid, any axial section of which will be approximately a straight line, the desirable qualities of which, for a rotary plow, are fully stated in the application above referred to.

I will describe the necessary steps to make the oblique helicoid actually employed in the plow, illustrating it by drawings in correct proportion, from which it will be at once apparent to skilled steel plate designers how other sizes can be made.

Drawings accompany and form a part of this specification, which, taken with the descriptive matter, constitute a full disclosure, the novel features of which are particularly pointed out in the claims.

In the drawings:

Fig. I is a plan of a steel disc, which may be considered the raw material or starting point;

Fig. II is an orthographic projection of Fig. I, showing that the disc has a hole in the center and that the edges of the disc are drawn to a thinned edge, because the initial sharpening is better done here than later;

Fig. III is a plan of the same disc shown in Fig. I with the first operation performed, that is the disc has been dished in the center and has an out flaring rim that finally terminates in a plane parallel to the plane of the center, but spaced therefrom, having been subjected to the action of cooperating dies, which are represented in dotted lines in Fig. IV;

Fig. IV is an orthographic projection of Fig. III and includes dies in dotted outline that I have found convenient for producing and reproducing the desired flat bottomed out flaring dish like structure shown;

Fig. V shows the operation step of Figs. III and IV completed, with the planar, center or bottom of the dish removed;

Fig. VI shows the work, represented in Fig. V, with the cutting operation done, which consists of cutting a narrow V shaped piece from circumference to the edge of the inner hole;

Fig. VII is an orthographic projection of Fig. VI;

Fig. VIII is the next operation after that shown in Figs. VI and VII, which consists of pulling the edges of the V shaped cut in opposite directions, which, if the curve has been accurately made, will result in an almost perfect oblique helicoid as shown, though slight differences in plate thickness and/or heating may require additional forming which will preferably be done with the helicoid well warmed up;

Fig. IX shows a form for truing up and will be of heavy cast iron that will stand hammering of any possible kinks in the helicoid;

Fig. X is a figure showing two oblique helicoidal cutter blades mounted on an axial shaft;

Fig. XI shows a complete cutter for a plow shaft with two flights of oblique helicoidal cutters bolted in place; and Fig. XII is an enlarged detail useful in explaining the manner of assembly.

For the purpose of this specification, an oblique helicoid is defined as a surface curved in one direction and flat in a direction normal to the curve, whose generatrix glides along a fixed helix at a constant angle to its axis, which angle is less than a right angle; see A, Fig. XII.

The disc 10 will be made of plow steel or one of the extremely tough long wearing alloy steels which are available. The edge will be sharpened as shown at 11 and a relatively small hole 12 will be provided at the center.

Co-operating dies according to the outline, dotted, in Fig. IV, will be provided with a central hardened pin that will enter the hole 12, thus centering the piece with respect to the dies, the work being at forging heat for the material selected. Then by press, or steam hammer, the disc 10 is forged into the shape shown in Fig. IV. It will be at once observed that the central disc portion 10a serves to hold the remainder of the disc 10 while the area represented by the zone Z is unequally stretched inversely as the distance of any circumferential line thereon from the edge central portion 10a. The curve shown is right for a pitch angle of about ten degrees, as shown in Fig. XII, and will vary for other pitch angles. This pitch angle is shown at PA in Fig. XII.

In Fig. XII, two oblique helicoids are shown but may not always be necessary, especially in light friable soils that are plowed when in fairly dry condition. The separate helicoids are indicated by the numerals 4 and 5. This figure also shows an angle, the base of which, marked S, represents the straight side of the oblique helicoid and its relationship to a line normal to the axis of the helicoid, which angle is always less than a right angle.

The important thing is to stretch the metal of the disc 10 from the edge of the zone which will later form the inside line of the oblique helicoid, uniformly, so that when the curved surface is pulled out, as shown in Fig. VIII, the curve is all in one direction, the direction normal to the curve being straight. This portion of the metal cannot be evenly stretched without holding the disc firmly by either its inner or its outer edge. I hold it by letting the central flat disc portion 10a remain in place until the stretching is completed.

As the next step, I cleanly remove the central portion 10a, which may be conveniently done with a cutting torch. Next, I cut from center to edge as shown in Fig. VI, removing a narrow angular piece, and then reheat and stretch to the shape shown in Fig. VIII, which may be conveniently done with clamps and a chain block. If the work of designing the dies has been well done, the stretching will result in an approximately perfect oblique helicoidal section, with more than a complete revolution of its generatrix, of substantially less outside diameter than the original disc 10 and with a projected diameter of its inner boundary that is proportionally smaller than the flat central disc portion 10a.

This blank will require truing up on the mandrel 8 which is also useful in making the flanges 2 and 3, see Fig. XII, which latter can be made from narrow bar stock heated to forging heat and clamped in place preparatory to forging. These flanges can doubtless be made by rolling one edge, in quantity production, but I have not tried this. Some necessary adjustment of the flanges 2 and 3 is easily made by heating them locally with a welding torch and hammering to line after they are welded to the shaft 1, checking by a section of helicoid or a template made to fit it.

Holes for bolts 6 are drilled in the flanges 2 and 3, sections of the oblique helicoid are clamped in place and registering bolt holes therein readily cut with a cutting torch. After bolting in place and careful abutting of the ends of different helicoid sections, these latter are butt-welded together to make a continuous flight. The line B, Fig. X, represents the butt-weld.

Having fully disclosed the method of making this peculiar but critical forging so that those familiar with such work may make them in any required size, what I claim as new and desire to secure by Letters Patent, is:

The method of making an oblique helicoid cutter element, which consists of forming a disc of material into a flat bottomed rim the outer boundary thereof being a plane parallel to but spaced from the plane of the bottom, the rate of curvature of the said rim being inversely proportional to its distance from the flat bottom, removing the bottom, cutting the rim radially and pulling in opposite directions on the edges produced by the cut to form the oblique helicoid.

GUSTAVE O. MATTER.